United States Patent [19]

Hoferer et al.

[11] Patent Number: 4,881,292
[45] Date of Patent: Nov. 21, 1989

[54] HOUSING ATTACHMENT ASSEMBLY WITH A PLASTIC ATTACHMENT TAB AND A CLIP

[75] Inventors: Richard Hoferer, Bietigheim-Bissingen; Arthur Klotz, Remseck; Volker Lehmann; Günter Trumpfheller, both of Ludwigsburg, all of Fed. Rep. of Germany

[73] Assignee: Filterwerk Mann & Hummel GmbH, Ludwigsburg, Fed. Rep. of Germany

[21] Appl. No.: 277,350

[22] Filed: Nov. 29, 1988

[30] Foreign Application Priority Data

Dec. 2, 1987 [DE] Fed. Rep. of Germany ....... 3740760

[51] Int. Cl.$^4$ .......................... B65D 55/00; F16L 5/00
[52] U.S. Cl. ............................................ 16/2; 248/56; 24/713.6
[58] Field of Search .......................... 16/2, 3, 108, 109; 24/141; 248/56; 220/465, DIG. 4

[56] References Cited

U.S. PATENT DOCUMENTS

Re. 29,752 9/1978 Jacouette, Jr. .............................. 16/2
518,681 4/1894 Tyler ..................................... 24/141
2,840,013 6/1958 Seils ......................................... 16/2

FOREIGN PATENT DOCUMENTS 8326752.2 12/1985 Fed. Rep. of Germany .

OTHER PUBLICATIONS

Schreyer, "Konstruieren mit Kunststoffen", (Constructing with Plastics), Carl Henser Verlag Muenchen 1972, pp. 266–267.

Primary Examiner—Richard K. Seidel
Assistant Examiner—Carmine Cuda
Attorney, Agent, or Firm—Foley & Lardner, Schwartz, Jeffery, Schwaab, Mack, Blumenthal & Evans

[57] ABSTRACT

A housing, such as an air filter housing, with a plastic attachment tab is provided with a releasable, one-piece, U-shaped attachment clip engaging in a through aperture in the attachment tab and having sleeves formed in the vicinity of the through aperture on the inside of each leg of the U-shaped clip, and at least one resilient tongue on each leg of the clip pressing against the attachment tab.

8 Claims, 1 Drawing Sheet

HOUSING ATTACHMENT ASSEMBLY WITH A PLASTIC ATTACHMENT TAB AND A CLIP

BACKGROUND OF THE INVENTION

The present invention relates to an attachment assembly for a housing such as an air filter housing with a plastic attachment tab and a releasable attachment clip. The attachment tab has at least one through aperture and is used to fasten the air filter housing to a motor vehicle by means of screw connections. This fastening is accomplished in such a way that the air filter housing will not come loose, despite the vibrations to which it is exposed.

For the attachment of air filter housing using attachment tabs of this type, it is known to insert an additional metal part into the through aperture. When the screw connections are tightened, the vibrational forces are absorbed by the metal part and therefore do not loosen the screw connection as a result of the creepage of the plastic in the course of time (see Schreyer, Gunther "Konstruieren mit Kunststoffes" "Constructing with plastics", Hanser Verlag Munich 1972, pages 266, 267). These metal parts are either surrounded with plastic by injection molding during production of the attachment tab, or they are subsequently attached to the attachment tab as an additional part. This first method of fastening the metal part is relatively expensive and is therefore undesirable when mass producing plastic parts. For this reason, the metal parts are usually attached to the attachment tabs subsequently.

A metal plate, for example, has been used for this purpose, and a metal sleeve which projects through the tab aperture is formed on the plate. The plate is sufficiently long so that it can be crimped around on the bearing surface of the attachment tab. The metal part is thereby connected firmly to the attachment tab like a rivet. Lateral guides on the surface of the attachment tab opposite the bearing surface prevent lateral rotation of the metal part. This method is considered disadvantageous because the metal part has to be produced separately as a drawn part and then inserted with its sleeve into the through aperture. The fastening then has to be carried out subsequently in a separate operation. In addition, this attachment method can cause the surface protection to be damaged.

SUMMARY OF THE INVENTION

Accordingly, it is the object of the present invention to provide an improved attachment assembly for a housing such as an air filter housing with plastic attachment tab and releasable attachment clip.

A further object of the invention is to provide an attachment clip that is formed in one piece with a U-shaped design.

Another object of the invention is to provide a housing attachment tab and attachment clip combination that can be produced more economically.

Still another object of the invention is to provide a housing attachment tab and attachment clip combination that is simpler to use.

These and other objects of the invention are achieved by providing a housing attachment assembly comprising:

(a) a plastic attachment tab having at least one through aperture for receiving a fastening screw for attaching said housing to a support structure; and (b) a one-piece, U-shaped attachment clip with two generally parallel legs, said clip being arranged on said attachment tab with said tab projecting between said legs, each of said legs comprising a sleeve formed on the inside of the leg in the vicinity of said through aperture of said attachment tab, each said sleeve extending into said through aperture and being supported against the other sleeve when a fastening screw is screwed therethrough, and each of said legs further comprising at least one resilient tongue projecting into engagement with said attachment tab.

The invention is particularly applicable to an air filter housing with a plastic attachment tab and releasable attachment clip. The attachment tab can be connected to the housing in one piece and can have one or more through apertures. The releasable clip engages into a through aperture of the attachment tab. The clip is preferably made U-shaped and in one piece. The clip has sleeves which are formed on the inside of each of its two legs in the vicinity of the through aperture. The sleeves are supported against one another when the clip is pressed together. In this way, a predetermined free space is left between the legs. The attachment tab is retained in the free space between the legs maintained by the sleeves when the clip is affixed thereto.

During assembly, the sleeves formed on each of the legs engage into the through aperture and absorb the vibrational forces which occur when the air filter housing is fastened to the motor vehicle. The sleeves can be of equal or differing length, but preferably sleeves of equal length will facilitate the overall economical production of the clip. The U-shaped design of the clip additionally ensures that a connecting web between the two legs will serve as a stop to prevent lateral rotation of the clip during the attachment of the air filter housing.

Each leg has at least one resilient tongue pressing against the attachment tab. The resilient tongues serve to compensate for tolerances, both those in the thickness of material of the attachment tab and those which arise during the production of the clip. These resilient tongues thus ensure a firm fit of the clip on the attachment tab.

The retention of the clip on the attachment tab may be further improved by arranging several resilient tongues on each leg, without appreciably increasing the expense of manufacturing the clip. Several resilient tongues will help assure that the clip is held firmly on the attachment tab even after frequent vibration. An attachment arrangement which has proved favorable involves forming one resilient tongue on the fixed end of each leg and two resilient tongues, distributed over the width of the leg, on the free end of each leg.

Upon the removal of the air filter housing from an automobile, the clips are pushed over the attachment tab. The releasability of the clip from the attachment tab is also an advantageous feature of the design of the present invention. In comparison with the prior art, this assures simpler handling, while at the same time allowing for simplified production of the metal part and for a higher quality of the final product.

BRIEF DESCRIPTION OF THE DRAWINGS

The invention will be described in further detail with reference to the accompanying drawings in which.

DETAILED DESCRIPTION OF THE PREFERRED EMBODIMENTS

Figure 1:
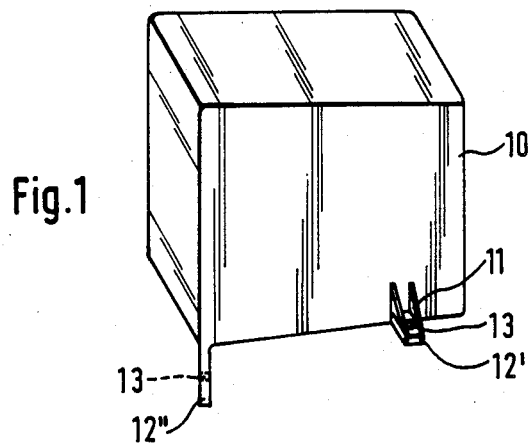
FIG. 1 is a diagrammatic view of an air filter housing according to the invention.

As shown in FIG. 1, a schematically represented air filter housing 10, with raw air and filtered air ports which are not visible, has differently designed attachment tabs 12' and 12". Both the attachment tab 12' and the attachment tab 12" are preferably integrally formed with the air filter housing. The attachment tab 12' is connected to the air filter housing 10 via webs 11 for reinforcement. As a result, this attachment arrangement takes the form of an attachment shoe, while the tab designated by 12" extends away from the filter housing 10 without additional webs. Both attachment tabs 12', 12" are provided with through apertures 13 for receiving a fastening screw.

Figure 2:
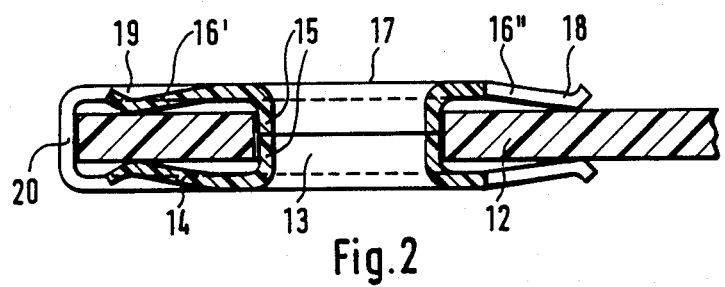
FIG. 2 is a cross-sectional side view of an attachment tab with an attachment clip.

FIG. 2 shows, enlarged in relation to FIG. 1, a cross-sectional side view of a clip 14 attached to the attachment tab 12'. The clip is formed integrally in one piece and is U-shaped. The U-shaped clip 14 comprises two legs 17. In a preferred embodiment, these legs extend along the length of the attachment tab, and are formed so as to be roughly parallel to the top and bottom surfaces of the attachment tab when the clip is attached thereto. The legs 17 each have a free end 18 and a fixed end 19. Preferably, it is the free ends of the legs which are closest to the air filter housing when the clip is affixed to the attachment tab.

Two resilient tongues 16" are arranged at the free end 18 of each of the legs 17. A further resilient tongue 16' is additionally provided adjacent the fixed end 19 of each of the legs 17. All the resilient tongues 16',16" project toward the inside of the U-shaped clip and press against the attachment tab when the clip is affixed to the tab. The resilient tongues 16',16" press against both the topside and the underside of the attachment tab 12' and thus give the clip 14 a firm hold thereon. The resilient tongues compensate for variations in the size of the attachment tab and the clip due to manufacturing tolerances.

The clip 14 has a sleeve 15 formed on the inside of each leg 17. When the clip is positioned on the attachment tab, the sleeves 15 desirably extend into the through aperture. Attachment clip 14 is fastened on its underside by a fastening screw, which is not shown, to a supporting structure such as a part of a motor vehicle. The fastening screw urges the sleeves 15 into contact with one another so that they are supported by each other. The attachment tab 12' is retained in the open space maintained by the sleeves 15 between the legs 17. The sleeves thereby absorb the forces exerted by the screw connection and prevent possible damage to the attachment tab.

Web 20, which connects the two legs 17 of clip 14, rests against and encompasses the free end face of the attachment tab 12' and prevents the clip from rotating out of its desired position on the tab when the fastening screw is tightened.

Figure 3:
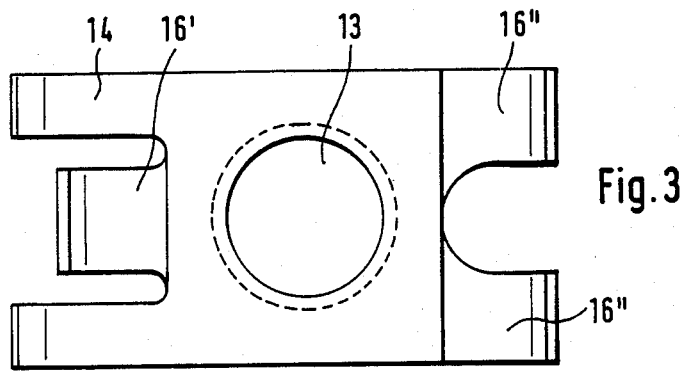
FIG. 3 is a plan view of a clip with resilient tongues.

FIG. 3 shows a plan view of the clip of FIG. 2 and illustrates the arrangement of the resilient tongues 16',16" and of the through aperture 13. A clip designed in this way can be produced economically and assures good retention on the attachment tab.

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with respect to the appended claims and equivalents.

What is claimed is:

1. A housing attachment assembly comprising:
   (a) a plastic attachment tab having at least one through aperture for receiving a fastening screw for attaching said housing to a support structure; and
   (b) a one-piece, U-shaped attachment clip with two generally parallel legs, said clip being arranged on said attachment tab with said tab projecting between said legs, each of said legs comprising a sleeve formed on the inside of the leg in the vicinity of said through aperture of said attachment tab, each said sleeve extending into said through aperture and being supported against the other sleeve when a fastening screw is screwed therethrough, and each of said legs further comprising at least one resilient tongue projecting into engagement with said attachment tab.

2. An assembly as recited in claim 1, wherein each of said legs has at least one resilient tongue at a free end thereof.

3. An assembly as recited in claim 2, wherein each of said legs comprises a plurality of laterally spaced resilient tongues at said free end.

4. An assembly as recited in claim 2, wherein at least one of said legs has a further resilient tongue adjacent a connecting web joining said at least one leg to the other leg.

5. An assembly as recited in claim 1, wherein said attachment tab is secured to said housing by means of support webs.

6. An assembly as recited in claim 1, wherein said attachment tab is formed integrally in one piece with said housing.

7. An assembly as recited in claim 1, wherein said housing is an air filter housing.

8. An assembly as recited in claim 1, wherein said attachment clip is removable from said attachment tab.

* * * * *